United States Patent [19]

Squires et al.

[11] Patent Number: 5,543,195
[45] Date of Patent: Aug. 6, 1996

[54] FLOCKED WOVEN FABRIC WITH FLATTENED FLOCK FIBERS

[76] Inventors: William J. Squires; William Th. Squires Jr., both of 26 E. Hunting Ridge Rd., Stamford, Conn. 06903

[21] Appl. No.: 241,607

[22] Filed: May 11, 1994

Related U.S. Application Data

[63] Continuation-in-part of Ser. No. 180,865, Jan. 12, 1994, abandoned.

[51] Int. Cl.⁶ .............. B05D 1/14; B05D 1/16; B05D 5/00; B32D 33/06
[52] U.S. Cl. .............. 428/90; 428/97; 428/919; 427/198; 427/200; 427/206; 156/72
[58] Field of Search .............. 428/90, 919, 97; 156/72; 427/200, 206, 198

[56] References Cited

U.S. PATENT DOCUMENTS

| | | | |
|---|---|---|---|
| D. 297,596 | 9/1988 | Marquart, Sr. | 428/919 |
| D. 301,289 | 5/1989 | McIlhinney | 428/919 |
| D. 326,363 | 5/1992 | Cooper | 428/919 |
| 2,231,995 | 2/1941 | Glidden et al. | 428/90 |
| 3,099,514 | 7/1963 | Haber . | |
| 3,171,484 | 3/1965 | Thal | 428/90 |
| 3,262,128 | 7/1966 | Morgan et al. . | |
| 3,616,136 | 10/1971 | Endrenyi, Jr. | 428/97 |
| 3,776,753 | 12/1973 | Habib . | |
| 3,849,236 | 11/1974 | Bourdon | 428/90 |
| 3,881,197 | 5/1975 | Andrews . | |
| 3,917,883 | 11/1975 | Jepson | 428/90 |
| 3,969,560 | 7/1976 | Lewis et al. | 428/90 |
| 4,095,940 | 6/1978 | Weingarten | 428/919 |
| 4,122,219 | 10/1978 | Fickeisen et al. | 428/90 |
| 4,287,243 | 9/1981 | Nielsen | 428/919 |
| 4,294,577 | 10/1981 | Bernard | 8/448 |
| 4,314,813 | 2/1982 | Masaki . | |
| 4,362,773 | 12/1982 | Shikinami | 428/90 |
| 4,482,593 | 11/1984 | Sagel et al. | 428/90 |
| 4,656,065 | 4/1987 | Yacovella | 428/919 |
| 4,781,959 | 11/1988 | Gottlieb | 428/919 |
| 4,895,748 | 1/1990 | Squires . | |
| 4,997,452 | 3/1991 | Kovach et al. . | |
| 5,059,452 | 10/1991 | Squires . | |
| 5,126,182 | 6/1992 | Lumb et al. . | |

FOREIGN PATENT DOCUMENTS

| 3028984 | 2/1988 | Japan | 428/90 |
|---|---|---|---|
| 6506056 | 11/1965 | Netherlands | 428/90 |

*Primary Examiner*—Terrel Morris
*Attorney, Agent, or Firm*—Corbin, Gittes & Samuel

[57] ABSTRACT

A fabric which prevents outerwear from being noticed, heard or smelled by prey when worn. The fabric includes a flocked woven substrate with flattened flock fibers with the fibers adhered to the substrate. The substrate is quiet and soft. Preferably a printed layer is transferred on said flattened flock fibers and preferably is of a camouflage print pattern. The substrate is drapeable as an apparel item and more abrasion resistant than foamed knitted fabrics. Further the fabric is resistant to burr retention, wind and rain.

24 Claims, 1 Drawing Sheet

FLOCKED WOVEN FABRIC WITH FLATTENED FLOCK FIBERS

CROSS-REFERENCE TO APPLICATIONS

This is a continuation-in-part of U.S. patent application Ser. No. 08/180,865, filed Jan. 12, 1994, now abandoned.

BACKGROUND OF THE INVENTION

The present invention relates to a flocked woven fabric onto which may be printed a colorful pattern or solid color. Solid color may be achieved by stock dyeing flock. The flock is thermally set into a laid-down, flattened directional state. The colorful pattern or solid color appears crisp and well-defined without distortion. When used as hunter's outerwear, the fabric is quiet, camouflaged by its colorful pattern, wind-resistant, abrasion-resistant, drapeable, burr retention resistant and preferably treated with a scent-inhibiting chemical. As a result, the fabric serves as a washable apparel item, which will neither be seen, heard or smelled by prey.

Transfer printing onto flattened flocked surfaces is known in the upholstery trade where the flocked surfaces are atop woven backing. Due to the fiber, yarn and construction, the upholstered fabric can't be dyed commercially without shrinkage. The relatively harsh backing is unsuitable for apparel because it is not particularly drapeable. Further, the harsh backing is rough to the touch and therefore noisy in that it rustles appreciably if rubbed against itself or other objects. If outerwear contained such backing and were worn by hunters trying to elude animal prey, such a rustling noise would be detrimental to the hunter's effort at being evasive.

Transfer printing onto flocked surfaces for blankets and apparel has been revealed by earlier patents of one of the present inventors, that is, U.S. Pat. Nos. 4,895,748 and 5,059,452, both of whose contents are incorporated herein by reference. However, those patents teach about foamed knitted fabrics, such as those which include a flocked polyurethane foam with flattened fibers which are color printed. Such foamed knitted fabrics have excellent insulating properties but have relatively poor abrasion resistance. The present inventors have made some observations.

In general, foam has a low abrasion point and has been known to crumble when exposed to extremes of humidity and heat over extended periods of time. Further, foam may break down when subjected to strong caustic chemicals or dry cleaning.

When used in outerwear, the foam should be secured to a stretchable backing, such as a knitted substrate, to improve strength. Foam is somewhat permeable and therefore limited in its ability to provide wind-resistance. Foam retains water that renders a fabric somewhat bulky and less drapeable than is the case without it.

A hunter's outerwear plays an important role in the success or failure of the hunt. Hunters do not want to be seen, heard or smelled by their prey. Hunters prefer their outerwear to blend in with their surroundings rather than stand out.

If the appearance of hunter's outerwear contrasts markedly with the environment, the prey may notice the contrast and become startled and dart away. For this reason, a camouflage pattern is preferred to blend in with the surroundings. Depending upon the type of fabric to which the pattern is applied, the realism, coloring and crispness in definition of the pattern will vary. Ideally, the surface of the fabric should not distort the pattern or otherwise take away from the realism of the camouflage.

For instance, if the fabric is knitted or woven, the texture of its surface structure will distort the camouflage pattern or otherwise take away from the realism, crispness or definition. A fabric composed of plastic, on the other hand, has a surface structure which would not distort the pattern.

Many states set aside areas for hunting and require that the outerwear contain bright orange color for safety reasons, because orange is easily recognized by other hunters in the woods and contrasts from the naturally existing colors of wildlife. There is some controversy as to whether the bright orange color, while easily seen by people, is outside the color sensitivity of the eyes of animal prey. If so, outerwear colored bright orange, despite its brilliance when viewed by the human eye, is no more noticeable to wildlife than are other colors.

The surface structure of the fabric, if woven or knitted, however, may diminish the color intensity of the orange color, rendering it less brilliant than it might otherwise be. There are color standards and regulations for hunter's outerwear which require that the orange color satisfy a certain minimum level of brilliance for safety reasons, which may be difficult to meet with outerwear composed of certain types of fabrics.

Unfortunately, many fabrics whose surface structure will not distort color patterns are noisy in that as the hunter moves about or approaches prey, the fabric makes noises which may scare away the nearby prey within earshot.

For instance, the conventional bright orange plastic raincoat poncho may satisfy the brilliance level for orange required for hunting and is waterproof, which is a desired feature for use outdoors. Nevertheless, such a poncho is too noisy for most hunters. It does a hunter little good to appear invisible to prey if the outerwear is so noisy as the hunter approaches that the prey scares off. Indeed, prey may frighten based on what they hear rather than on what they actually see.

Knitted or brushed woven fabrics, on the other hand, are more quiet as the hunter moves about. This is attributed to their surface structure being soft to the touch, rather than rough, so that when rubbed against itself, little if any noise is heard. Nevertheless, the surface structure of the knitted or brush woven fabric, as mentioned previously, distorts the realism of the pattern printed on it.

A nuisance associated with the wearing of conventional outerwear is that the fabric material may pick up burrs, leaves, sticktights, thistles, plant-life originated "hitchhikers", etc. in the outdoors which cling or stick to the fabric (the matter picked up will collectively be referred to hereafter as "burr(s)"). As a consequence, the fabric becomes noisy; removing the burrs from the fabric is a time-consuming task, because each burr must be pulled off the outerwear individually. The task becomes more difficult to accomplish while in the outdoors because the outerwear is being worn at the time and, while the wearer could take time out to clean the outerwear of the burrs if so motivated, inevitably more burrs will be picked up again. Thus, pulling out the burrs individually is a never ending, time consuming and frustrating process to perform. To a hunter, burr retention is more than just a nuisance; any additional noise generated by the outerwear, such as that attributed to the retention of burrs, increases the risk of frightening prey that are within earshot.

Untreated outerwear, when worn, eventually picks up the smell or body odor of its wearer. If downwind of the hunter, prey, which has a keen sense of smell, may pick up the scent given off by such outerwear. Thus, even if the outerwear is quiet and camouflaged, such precautions against being noticed by the prey are defeated if the hunter's scent is picked up by the prey from the outerwear.

Scent inhibiting chemicals for fabrics are available commercially, such as that sold under the trademark ULTRAFRESH™. Therefore, the fabric of the outerwear should be treated with such scent inhibiting chemicals. In this manner, the scent retention problem in outerwear goes away. When a quiet fabric is so treated and camouflaged, the wearer is neither seen, heard or smelled downwind by the prey.

Of course, the outerwear should also be made for comfort. In this connection, the outerwear fabric preferably should be drapable, washable, water resistant, wind resistant, abrasion resistant and burr retention resistant. Further, the fabric should be pleasant to the touch. Also, the fabric should not shrink excessively when subjected to a commercial dyeing process or home wash and dry, but the outerwear should be moisture permeable and breathable.

The outerwear may be exposed to extremes of outdoor temperatures such as temperatures below the freezing point of water. Such frigid temperature conditions may occur unexpectedly and rapidly in some wilderness areas either during the night or from sudden wind chill in mountainous areas. Preferably, the constituents of the flocked outerwear should withstand such temperature extremes without becoming stiff or otherwise causing discomfort to the wearer while moving about.

Many conventional thin fabrics, when color printed upon, normally bleed the colors through, making it commercially impractical to print on the bled through side. Examples of such fabrics include woven poly/cotton, which is used in outerwear for the hunting trade. Thicker fabrics can be used that allow printing on both sides without bleeding the colors through, but such fabrics are obviously heavier, bulkier and generally less cost competitive to use in the mass production of outerwear than thinner fabrics.

It would therefore be desirable to provide an outerwear fabric which helps the hunter from being seen, heard or smelled by prey. It would also be desirable to provide an outerwear fabric useful for other applications, such as rainwear or for use at outdoor sporting events and activities, and which provides a distortion-free color crispness and yet is abrasion resistant and washable. It would further be desirable to employ a fabric that lends itself to color printing on both the front and back without the color bleeding through, and yet the fabric substrate itself may be relatively thin.

SUMMARY OF THE INVENTION

The present invention relates to a transfer printed drapable flocked fabric, whose flock is thermally set into a flattened state to provide a substantially flat and smooth surface. The fabric's surface readily accepts print, which will appear crisp and substantially distortion-free. Colors of the pattern appear particularly vivid in that the flocked surface does not significantly degrade the color brilliance or intensity. Indeed, the fabric is capable of accepting print on both the front and back without the colors appearing to bleed through.

Further, the fabric is burr-retention resistant and lightweight with little bulk. The fabric is quiet, soft and drapeable and capable of accepting and retaining a water repellant finish, a lamination of breathable or non-breathable films, and an anti-bacterial finish to stop odor causing bacteria from proliferating. In addition, the fabric is washable, self-lined and offers better wind and rain resistance than knitted fabrics that stretch and has a pleasant suede-like hand and appearance when fine flock fibers are used or has a velour-like hand and appearance when coarse flock fibers with longer lengths are used.

Preferably, the outerwear is reversible and both the front and back lend themselves to being printed upon without the colors bleeding through to the opposite side. Thus the same outerwear becomes suited for multiple applications.

Thus, if the front has a camouflage print pattern and the back has a bright solid color pattern such as orange, then the hunter wearing the outerwear may have the front with the camouflage print face out to blend in with the surrounding foliage in the hunting area, but may reverse it to have the back with the bright solid color pattern face out for safety reasons while traveling back and forth from the hunting area. On the other hand, if the front has a spring or fall camouflage print and the back has a winter camouflage print, then the reversibility allows the outerwear to match the terrain for multiple seasons.

The outerwear in accordance with the invention helps prevent the wearer from being seen, heard or smelled by prey. The camouflage print helps to blend in the outerwear with the surrounding foliage and the adhesive prevents color bleed through when both front and back are being printed upon; the woven substrate with flattened flock fibers renders the outerwear quiet and burr-retention resistant; and the anti-bacterial finish diminishes odor retention.

Further, the present invention is suited to other industries other than the hunting trade, such as serving as the fabric for sportswear or rainwear. If desired, the flattened flock fibers could be subsequently brushed to stand up rather than remain lying flat along the substrate.

BRIEF DESCRIPTION OF THE DRAWING

For a better understanding of the present invention, reference is made to the following description and accompanying drawings, while the scope of the invention is set forth in the appended claims.

DESCRIPTION OF THE PREFERRED EMBODIMENT

Figure 1:
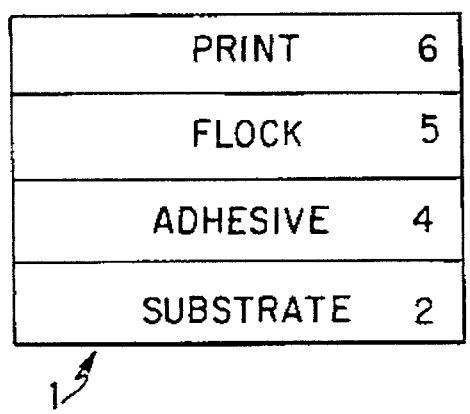
FIG. 1 is a schematic cross-section of the flocked fabric in accordance with the present invention.

FIG. 1 shows the fabric in accordance with the invention being in the form of a woven substrate 2 to which is adhered flock 5 by an acrylic, polyurethane or other type of adhesive 4. The flattened flock 5 is thermally set into a substantially flattened and, if long enough, entangled state. The transfer printing process leaves a layer of colored dry ink print 6 on the flattened flock 5. The substrate 2 is preferably soft, washable and dyeable, such as a woven polycotton blend, woven polyester or woven polypropylene material. Transfer printing onto this flattened flock surface provides a surprisingly crisp and clearly defined pattern whose colors appear as vivid and intense as on the transfer paper from which the pattern came.

Figure 2:
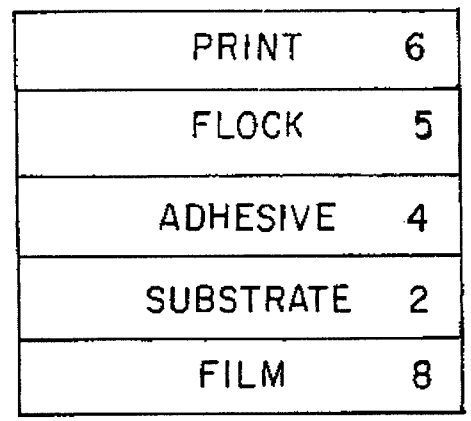
FIG. 2 is a schematic cross-section of the flocked fabric as in FIG. 1, but further shows a waterproof breathable film laminated onto the substrate.

The woven polyester and woven polypropylene are examples of suitable materials for the substrate 2 because they are hydrophobic, i.e., they do not appreciably absorb moisture and are well suited for lamination with waterproof breathable films, such as Gortex™ or Dry-Plus™. With such materials forming the fabric, moisture will not be retained on the inside of the fabric. The lamination of such a waterproof breathable film 8 onto the substrate 2 is depicted in FIG. 2.

Figure 3:
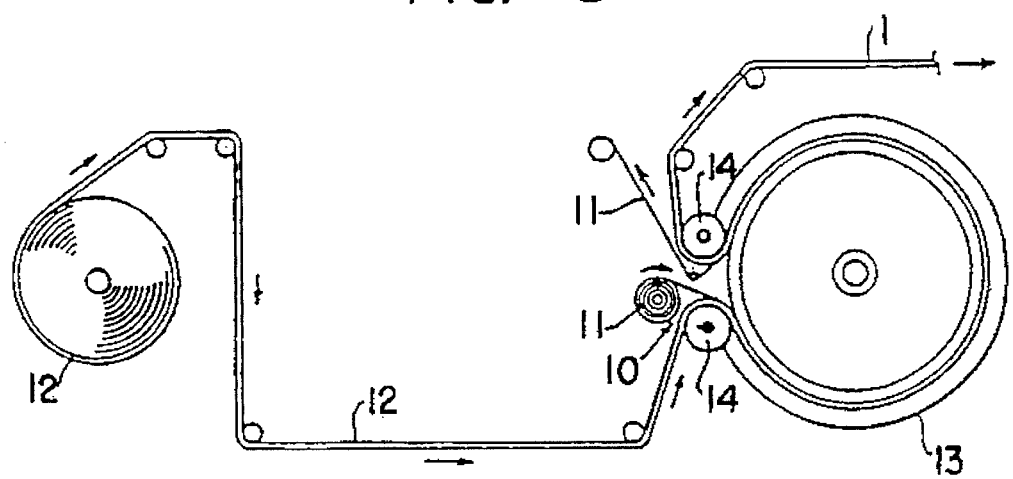
FIG. 3 is an elevational schematic view of the flocked fabric being subjected to a dry ink transfer process in accordance with the present invention.

FIG. 3 illustrates a dry ink transfer process used to flatten the flock fibers and transfer dry ink onto the flock. A pattern or solid color 10 is printed onto special print paper 11. The print paper 11 and flocked fabric 12 are fed together between rollers 13, 14 in a conventional screen transfer printing machine. The pattern or solid color 10 is against the flock fibers. At least one of the rollers is heated at a temperature of approximately 400 degrees Fahrenheit and pressure is applied by the rollers against the fabric and sheet for approximately 30 seconds to enable the transference of the dry ink of a multicolored print pattern or solid color 10 onto the flock. Instead of rollers, any type of pressure elements, such as pressure plates, could be used.

The process of screen transfer printing involves first making screens for each color to be print transferred, then printing onto paper through the screens, and finally running the paper with the fabric through a print transfer machine, such as a rotary screen print transfer machine of Stork under model numbers TC 101 and TC 131 or of Kannegieser. Alternatively, conventional rotogravure printing machines may be employed for printing a pattern in accordance with the invention. Both the flock and substrate may be dyed a solid color in advance of the flock flattening and either in addition to or in lieu of the transfer or rotogravure printing.

More specifically, the preferred embodiment of the invention employs fiber (preferably 1 to 3 denier dull nylon or polyester fiber and 0.025 to 0.080 inches or other fiber lengths), which is adhered to a substrate that is a polycotton blend or 100 percent polyester with an acrylic based and/or polyurethane adhesive (two coats). The smaller the selected value of the denier of the flock fibers (or the thinner the flock fibers), the softer the suede-like feel of the fabric after flattening the flock fibers.

Flock of fine denier (1 to 2 denier) with short fiber length (0.025 to 0.05 inches) provide a flatter surface when flattened than coarser flock (3 denier and up) with longer fiber lengths so that a transferred print looks more distortion-free on the flattened surface. In view of the better compactness afforded by the finer denier and shorter fiber length, better water repellency, burr retention resistance, wind resistance, and resistance to color bleed through is attained.

The inventors have observed that when some adhesives are exposed to outdoor subfreezing temperatures such as temperatures below 15 degrees Fahrenheit, the outerwear to which such adhesives are applied may stiffen. Such stiffening may cause some discomfort to the wearer, as well as render the outerwear noisy. Bear in mind that frigid temperature conditions come about before sunrise in some geographical locations depending upon the season and also may come about quickly due to sudden wind chills as are common in mountainous regions. One way to avoid such fabric stiffening is to select an adhesive that retains its flexibility under such frigid temperatures. A suitable adhesive may be obtained commercially from Spectro-coating of Leominster Mass. by ordering from them an adhesive that satisfies the following criteria: suitable for flocking into a woven fabric and for remaining flexible when exposed to outdoor environmental temperatures between 0 and 15 degrees Fahrenheit such that it will not stiffen the fabric under such frigid temperature conditions.

The fiber and substrate with the adhesive are fed into conventional flocking equipment and then transfer printed with a camouflage pattern on a dyed or white background. To make the pattern, paper is inked (one ink color at a time) and then the completed pattern on the paper is transferred onto the fabric in a print transfer machine which thermally sets the flock into a flattened state.

The polycotton (such as 65/35) may be substituted by a hydrophobic material such as 100% woven polyester or 100% polypropylene. Any blend of such materials may be employed. Instead of nylon, the flock may be composed of rayon or other conventional flock materials or any combination thereof.

The print pattern itself appears essentially distortion-free on the flattened flock fibers, i.e., as crisp as the ink pattern on the transfer paper or other medium which was used to transfer the print pattern onto the flattened flock fibers. This enables a realism in the print pattern previously unknown for outerwear. The transfer print stands up to washing better than would a wet print process on cotton.

For instance, the print pattern could have the realism and crispness of detail of an ink based painting in which the colors appear vivid. This realism effect is particularly pronounced with conventional rotogravure transfer printing, which employs an engraved roller instead of screens.

If the flock and substrate are dyed a bright fluorescent orange background with a transfer printed black camouflage forefront, the camouflage black furthers the effect of appearing to blend into the natural environment and the fluorescent orange readily satisfies state standards for visibility of hunter outerwear. There is substantially no surface distortion due to the texture or surface structure of the fabric.

If fluorescent orange is not a requirement, the flock and substrate may be dyed a different solid color as desired commercially. Conventionally, the substrate and flock are readily available in a solid color such as white. If some other color is desired, one technique to change the color is to separately dye the substrate the desired color before flocking, dye the flock by itself the same color, and then flock the dyed flock into the dyed substrate.

One way to reduce the number of processing steps for attaining the change in color is to piece dye the flocked substrate itself the desired color, rather than separately dye the flock and substrate in advance before flocking. This has the added advantage of avoiding the need to clean both equipment for dyeing just the flock and equipment for dyeing just the substrate when the job is complete, because only one type of equipment, i.e., that for dyeing flocked substrate, will require cleaning when the job is complete.

By flocking into the woven substrate, flattening the flock fibers by thermally setting them and then piece dyeing the fabric a solid color, the resulting fabric feels less stiff and has a softer hand than before the dyeing, thanks to the elevated temperature and pressure involved in the dyeing process which seem to break down the stiffness in the adhesive and substrate. A typical temperature in such a dyeing process may be in excess of 212 degrees Fahrenheit.

Further, the flocked woven fabric of the invention is drapable, washable, water resistant, burr retention resistant, pleasant to the touch, i.e., comfortable to the wearer. During manufacture, the fabric should have little or no shrinkage when subjected to a commercial dyeing process. Also, the fabric should have little or no shrinkage when subjected to home wash and dry.

Preferably, the fabric is treated with scent inhibiting chemicals, such as that sold under the trademark ULTRAFRESH™, if used for hunting. In this manner, prey which is downwind will not smell the hunter because the treatment finish will not promote the growth of odor causing bacteria. Such treatment is therefore good for concealing the body odor of the wearer.

As a result, a hunter wearing outerwear made from this treated fabric may move about in the wilderness without the outerwear being responsible for the hunter being heard, seen, or smelled by the prey. Further, by dyeing the flock and substrate a bright fluorescent orange color, safety requirements for making hunters visible to fellow hunters in the wild may be satisfied.

The present invention is not limited just to outerwear garments for the hunting trade. The fabric is fine outerwear for use at sporting events and as rainwear if treated chemically for water repellency in a conventional manner. The printed patterns appear distortion free on the flattened flock so as to provide for a crisp and well-defined pattern indicative of the realism of the original on the transfer paper or other medium. Further, the fabric holds up to repeated washings and will essentially not shrink.

By compacting the fibers during the flattening process onto a tightly woven substrate of the fabric, the compactness provides a wind-barrier for the fabric. The more tightly woven substrate provides better wind resistance than one which is knitted and stretchable because of the greater density of the woven material. Also, water repellency improves thanks to this compactness, as compared to that for knitted or woven fabrics without flock.

As compared to knitted foamed flocked fabrics, the flocked fabric of the present invention thereby has a woven substrate and thereby more dense and rigid, doesn't stretch, and provides better abrasion resistance.

In sum, the fabric of the present invention was developed with a desire to satisfy the following criteria:

The fabric's surface should be smooth to readily accept print, offering a sharp image with a realistic, life-like camouflage appearance. Also, the fabric should be burr-retention resistant and capable of accepting a print on both the front and back of the fabric and be as lightweight as possible with the little bulk. The fabric must be quiet, soft and drapeable and should be capable of accepting and retaining a water repellant finish, a lamination of breathable or non-breathable films, and an anti-bacterial finish to stop odor causing bacteria from proliferating. Further, the fabric should be washable and offer good wind and rain resistance.

Woven, knit or non-woven fabrics were ruled out as candidates for satisfying this criteria because their faces have surface distortions which would adversely affect the realism of any print applied to their surface. Woven manmade filament fabrics definitely rustle or make noise while the wearer moves about. The plastic material of a poncho raincoat fits into the same category as a generally noisy material when worn.

By flocking with fibers of approximately 1.0 to 5 denier and fiber lengths of approximately 0.025 to 0.08 inches (or longer lengths) into an acrylic or polyurethane adhesive or other type of adhesive, a soft, quiet face is realized. The adhesive is applied to a soft, quiet and washable substrate such as a woven poly/cotton blend, 100% polyester or polypropylene. A finish is applied to this substrate that inhibits the growth of micro-organisms which cause body odor.

After the flocking process, the fabric is transfer printed upon which thermally sets the flock fibers directionally into a flattened state to provide a clean, clear, flat, substantially distortion-free surface. It is on this flat surface that dyes or inks on transfer paper are transferred to provide a desired pattern, such as a camouflage print.

By having fibers compressed directionally into a more solid mass, the fabric becomes more wind-resistant and water-resistant than the woven substrate itself. This compression and directional lay of the fiber also retards the ability of the fabric to pick up burrs, leaves, sticks, etc. This burr retention resistance is a significant attribute for an outdoor fabric because most outdoor fabrics will pick up burrs which renders them more noisy and the burrs that attach are generally pulled off individually since they cling or stick to the outdoor fabrics.

The look and feel of the fabric is dependent upon the choice of denier and length of the flock fibers. For fine fibers such as 1 to 2 denier and between 0.025 to 0.05 inch length, the resulting flocked fabric has a soft suede-like hand. For coarse fibers such as 3 to 5 denier and between 0.05 to 0.08 inch length, the resulting flocked fabric has a coarser, velour-like hand.

Further, the fabric of the invention is drapeable and lightweight with little bulk. The flocked woven fabric is more abrasion-resistant than flocked foam knitted fabrics or flock knits. Any conventional water repellent finish may then be added to enhance the water-resistance afforded by the fabric.

Polyester would be selected over polycotton blends as the fabric substrate for those applications which call for better moisture permeability of the substrate; cotton is an absorber of moisture. Such moisture permeability is a desirable characteristic for outerwear apparel for hunters.

Although the preferred embodiment includes the substrate being made of either a polycotton blend, polyester or polypropylene, other types of woven fabrics and blends which are as quiet are as suitable. Such woven fabrics are soft, rather than rough, to the touch, and preferably brushed. The flocked woven fabric in accordance with the invention will be somewhat quieter than brushed woven or knitted fabrics alone because of the compressed flock, which has no ridges on which to scratch against bushes, trees or itself unlike the cross yarns of brushed woven or knitted fabrics.

Also, for applications calling for moisture permeability in outerwear, the present invention includes such fabrics which are also as moisture permeable as polyester, which is an ideal candidate for lamination to a breathable film to render the fabric wind-resistant and waterproof. In all cases, the quiet substrate selected is flocked and its fibers thermally set into a directional flattened state so as to provide a substantially distortion-free surface for transfer printing thereon.

Surprisingly, the flocked woven fabric of the invention is reversible. That is, both the front and back may be printed upon without the colors bleeding through to affect the appearance of the other side. It seems the adhesive, which is applied twice during the flocking process, serves as an effective barrier against color bleeding from one side to the other.

Such reversibility in lightweight outerwear is commercially important in the hunting trade. If the front and back have their own different camouflage pattern printed on, one pattern could be for spring or fall and the other pattern for winter so that the outerwear is suitable for matching the terrain in multiple seasons. If the front has a camouflage pattern and the back has a bright orange color, hunters will appreciate the ability to walk in and out of the woods with the orange color facing out for safety and reverse it so as to blend into the surrounding foliage with the camouflage print facing out after they arrive at the hunting area. As a consequence of the adhesive blocking the bleeding through of colors in the printed pattern to the opposite side, the lightweight outerwear of the invention is rendered reversible so that the conventional method of sewing together two fabrics to attain reversibility (at a higher cost and with much more bulk) is avoided.

Figure 4:
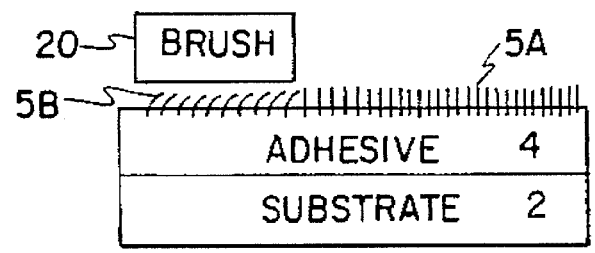
FIG. 4 is a schematic view of laid down flock being brushed to stand upright.

Further, after the flocked woven fabric has been transfer printed, the flock may be brushed in a conventional manner with a brush 20 so that the flock stands up 5A rather than remain in a laid down or flattened state 5B as illustrated in FIG. 4. Brushing will change the feel and the look of the fabric to some extent, but it will still have the benefit of having been transfer printed upon so that vivid colors in the print will still be apparent.

For safety purposes, it may be desirable to color the outerwear a bright fluorescent orange and yet have the flock stand upright. In accordance with the invention, this may be attained by performing the steps of flock fiber flattening, printing on the flattened flock and then brushing up the flattened flock.

As an alternative, these steps may be substituted by dyeing at least the adhesive and flock with a bright fluorescent orange either before or after the flock is adhered to the substrate. The flock fibers are not set into a flattened state but remain standing upright. The woven substrate itself may also be dyed the same color.

In either case, the outerwear becomes strikingly visible and easily distinguishable visually from the surrounding outdoor natural environment. Outerwear colored in such a manner may be used by hunters, police, cross-walk guards, etc., i.e., in situations where high visibility is important for safety reasons and where striking contrast with the surrounding environment is essential. That is, the wearer does not want the color of the outerwear to blend in with the environment when seen by other observers.

Of course, the color selected for dyeing the outerwear may be any highly visible color, such as bright red, green, yellow, blue, pink, etc., or any mixture thereof. A more intense color contrast is attained with the use of fluorescent colors. By dyeing both the flock and the adhesive a common color, the color intensity of the fabric when viewed from a distance is greater than would be the case if just the adhesive and substrate were dyed. This difference is attributed to the reflective properties of the flock fibers. By matching the color of the dyed adhesive, the dyed flock fibers enhance the overall color intensity due to their added surface area and do not detract from or dilute the color intensity effect as would be the case if the flock were left undyed or dyed a different color.

While the foregoing description and drawings represent the preferred embodiments of the present invention, it will be understood that various changes and modifications may be made without departing from the spirit and scope of the present invention.

What is claimed is:

1. A fabric, comprising:
    a woven substrate, flock fibers, an adhesive adhering said flock fibers to a face of said substrate, said fibers being thermally set into a flattened and laid down condition as a result of being flattened directionally from an erect condition, and a breathable waterproof film laminated onto another face of said substrate such that said substrate is between said film and said adhesive.

2. A fabric as in claim 1, further comprising a water repellent applied to said substrate for providing water repellency.

3. A fabric as in claim 1, wherein said flock and substrate are dyed a solid color.

4. A fabric as in claim 1, wherein said substrate is fibrous and the fibers are selected from the group consisting of a polyester cotton blend, polyester, nylon, natural fibers and polypropylene.

5. A fabric as in claim 1, further comprising a printed layer transferred onto said flock fibers that are in said flattened and laid down condition.

6. A fabric as in claim 5, wherein said printed layer includes multiple colors arranged in a camouflage pattern.

7. A fabric as in claim 5, wherein said printed layer includes a black camouflage pattern, said flock and substrate being dyed a solid color.

8. A fabric as in claim 5, wherein said substrate has a front side from which extends the flock that has the printed layer printed thereon, said substrate having a back side facing away from said front side, said printed layer having colors all of which fail to bleed through to said back side because said adhesive is arranged between said substrate and said printed layer so as to serve as a barrier against bleeding through of the colors to the back side.

9. A fabric as in claim 8, wherein said back side is printed upon.

10. A fabric as in claim 1, wherein said flock fibers have a denier between 1 and 2 and have a total fiber length of between 0.025 inches and 0.05 inches.

11. A fabric as in claim 1, wherein said flock fibers have a denier between 3 and 5 and a total fiber length of between 0.5 inches and 0.8 inches.

12. A fabric, comprising:
    a woven substrate, flock fibers and an adhesive adhering said flock fibers to said substrate, said fibers being thermally set into a flattened and laid down condition as a result of being flattened directionally from an erect condition, a scent inhibiting chemical applied to said substrate, and a breathable waterproof film laminated onto a face of said substrate such that said substrate is between said film and said adhesive.

13. A fabric as in claim 12, further comprising:
    a printed layer on said flock fibers.

14. A fabric as in claim 13, wherein said printed layer includes a camouflage pattern, said flock and substrate being dyed a solid color.

15. A fabric as in claim 12, wherein said adhesive maintains flexibility when exposed to outdoor subfreezing environmental temperatures.

16. A fabric, comprising:
    a woven substrate, flock fibers and an adhesive adhering said flock fibers to said substrate, said fibers being thermally set into a flattened and laid down condition is a result of being flattened directionally from an erect condition, said adhesive maintaining flexibility when exposed to outdoor subfreezing environmental temperatures, a breathable waterproof film laminated onto a face of said substrate such that said substrate is between said film and said adhesive.

17. A fabric, comprising:
    a woven substrate, flock fibers, an adhesive adhering said flock fibers to a face of said substrate said fibers being thermally set into a flattened and laid down condition with a portion being brushed to stand upright from said substrate, and a breathable waterproof film laminated onto another face of said substrate such that said substrate is between said film and said adhesive.

18. A fabric as in claim 17, wherein said adhesive maintains flexibility when exposed to outdoor subfreezing environmental temperatures.

19. A fabric as in claim 18, further comprising a scent inhibiting chemical applied to said substrate.

20. A fabric as in claim 17, further comprising a scent inhibiting chemical applied to said substrate.

21. A method of making a fabric, comprising the steps of:

providing a flocked fabric that includes a woven substrate and flock fibers adhered to the woven substrate with an adhesive, the flock fibers being in an erect condition;

directionally flattening the flock fibers to a flattened and laid down condition from the erect condition;

thermally setting said fibers in said flattened and laid down condition; and applying a waterproof breathable film to a face of said substrate such that said substrate is between said film and said adhesive.

22. A method as in claim 21, further comprising the step of:

transfer printing a layer onto said flock fibers that are in said flattened and laid down condition.

23. A method as in claim 21, further comprising the step of brushing up the flock so that said fibers change from being in said flattened laid down condition to standing upright.

24. A method as in claim 21, further comprising the step of dyeing the flocked woven substrate a solid color so that both the substrate and flock are dyed at the same time.

* * * * *